Patented Nov. 28, 1944

2,363,537

UNITED STATES PATENT OFFICE 2,363,537

COLORING OF TEXTILE FIBER

James William Libby, Jr., Louisville, Ky., assignor to E. I. du Pont de Nemours & Company, Wilmington, Del., a corporation of Delaware No Drawing. Application January 8, 1943, Serial No. 471,731

9 Claims. (Cl. 8—46)

This invention relates to the coloring of textile fiber. More particularly, this invention relates to dyeing or printing of textile fiber by developing on the fiber an azo dye of the phthalocyanine series.

It is an object of this invention to provide a process for producing novel, fast azo-colors of the phthalocyanine series on textile fiber such as cellulose, wool, cellulose esters, silk or nylon. It is a further object of this invention to provide a process whereby certain substantive azo dyestuffs of the phthalocyanine series may be produced on textile fiber in stronger and faster dyeings than obtainable by applying the finished colors from aqueous baths unto the fiber. Other and further important objects of this invention will appear as the description proceeds.

In copending application of H. Blackshaw and N. H. Haddock, Serial No. 444,107 (Pat. No. 2,339,740, issued January 18, 1944), a process is described for coloring of cellulosic fiber by impregnating the fiber with an azotized polyaminophthalocyanine, and then developing a fast color on the fiber by treating the same with an azoic coupling component.

In this specification and in the claims below the term azotized is used as a generic term for the common expressions "diazotized," "tetrazotized" and "polydiazotized." In other words, it is intended to describe the state of a substance or the process wherein one or more amino groups have been converted into diazonium groups, the prefixes di-, tri-, tetra-, or polydi- being dropped off to avoid confusion.

As coupling components in said copending application were selected compounds which were free of water-solubilizing groups or which could be converted on the fiber into water-insoluble forms by lactamization. As typical illustrations were mentioned the so-called "ice-color" coupling components, certain phenols, aceto-acetic ester and other compounds generally characterized by their freedom from water-solubilizing groups or capacity to produce a water-insoluble azo dye on the fiber.

In copending application of N. H. Haddock, Serial No. 451,076 (Pat. No. 2,351,119, issued June 13, 1944), the production of the same water-insoluble azo-phthalocyanine compounds in substance is described, by coupling azotized polyamino-phthalocyanines to coupling components free of water-solubilizing groups. The products are useful as pigments.

In copending application of N. H. Haddock, Serial No. 451,075 (Pat. No. 2,351,118, issued June 13, 1944), the production of dyes in substance is described by coupling in an aqueous bath, azotized polyamino-phthalocyanines to water-soluble coupling components, such as naphthol-sulfonic acids, the amino-naphthol-sulfonic acids, the aryl-pyrazolone-carboxylic acids, the sulfo-aryl pyrazolones, and the N-substituted amino-naphthol-sulfonic acids. The products may be used as direct dye stuffs for cotton and regenerated cellulose, or they may be converted into lakes by treatment for instance with barium chloride.

Unfortunately, the affinity of the last mentioned coloring compounds for cellulosic fiber is not very high, and when used as direct dyestuffs for cotton they produce weak dyeings of a low degree of washing fastness.

I have now found that coloring compounds of the last-mentioned groups, that is azo-phthalocyanine dyestuffs wherein the coupling components possess water-solubilizing groups, may be produced directly on the fiber, and that when so produced stronger dyeings may be obtained and the dyeings are of a high degree of wash fastness. This effect is very surprising inasmuch as it is not customary to employ water-soluble coupling components when developing an azo dye on the fiber. Furthermore, in view of the water-solubilizing groups in the finished dyestuffs, poor wash-resistance was to be expected.

The development of the color on the fiber according to this invention may be effected by impregnating the fiber with the azotized polyamino-phthalocyanine, for instance by treating the fiber with an aqueous solution of the diazonium compound at a temperature between 0 and 30° C., and then developing the color on the fiber with the chosen coupling component, for instance by rinsing the impregnated fiber in cold water and then treating it with an aqueous solution of a coupling component containing water-solubilizing groups, such as carboxylic acid, sulfonic acid, or their alkali-metal salts.

An alternative procedure is to impregnate the fiber first with the coupling component, and then treat the fiber with a neutral aqueous solution of the azotized polyamino-phthalocyanine. This procedure is to be preferred in the case of animal fibers, such as wool or silk.

In either of the above cases, the color may be developed in local designs, if desired, by printing from an engraved roll. For instance, a thickened paste containing an azotized amino-phthalocyanine may be printed on cotton cloth impregnated with the coupling component. Conversely, the thickened paste containing the azotized amino-phthalocyanine may be printed on the cloth first and the latter may then be treated with an aqueous alkaline solution of an azo coupling component.

The diazo-phthalocyanine compounds for the above purposes may be prepared according to the method described in U. S. Patent No. 2,280,072.

Any of the amino-phthalocyanines mentioned in copending application Serial No. 444,107 (Pat. No. 2,339,740) may be used for preparing the diazo component in this invention. For example, the (3)- and (4)- di-, tri- and tetra-amino derivatives of metal-free phthalocyanine, copper-phthalocyanine, cobalt phthalocyanine, and nickel phthalocyanine may be used.

In the preferred embodiment of this invention, the use of sufficient nitrite to azotize all of the available amino groups of the polyamino-phthalocyanine is contemplated. But satisfactory dyeings with, for example, tetra-amino-phthalocyanine may be obtained also by using less than 4 mols of nitrous acid for every mol of tetra-amino-phthalocyanine. As an example, a satisfactory dyeing for the purpose of this invention may be obtained by azotizing tetra-amino-copper phthalocyanine with sufficient nitrite to azotize only three of the amino groups, impregnating the fiber with said azotized amino-phthalocyanine, and coupling it thereon with one of the water-soluble azo components above specified. In this connection, it should be borne in mind that the polydiazonium phthalocyanines are not particularly stable, and even where sufficient nitrite is used to azotize all of the amino groups, decomposition of some of the diazo groups may take place prior to complete coupling; thus, in the case of tetra-amino-copper-phthalocyanine, for instance, the actual dyeing on the fiber may under circumstances be a mixture of the tetrakisazo, trisazo, disazo and even monoazo derivatives of the phthalocyanine compound.

Instead of using freshly prepared solutions of azotized amino-phthalocyanine for the purposes of this invention, there may be employed solutions prepared by dissolving in water phthalocyanine diazonium compounds which have been stabilized in dry form by conversion to the inorganic double salts, isodiazotates, etc. See, for instance, copending application of N. H. Haddock, Serial No. 443,668 (Pat. No. 2,349,090).

As coupling components for the purposes of this invention any of the coupling components mentioned in copending application Serial No. 451,075 (Pat. No. 2,351,118) may be employed. These may be grouped as naphthol-sulfonic acids, amino-naphthol-sulfonic acids, aryl-pyrazolone-carboxylic acids, sulfo-aryl pyrazolones and the various substitution products of the amino- naphthol-sulfonic acids which are still capable of coupling, as for example acyl-amino-ntphthol-sulfonic acids. Mixtures of the above components may be employed if desired, or the coupling on the fiber impregnated with the diazonium phthalocyanine compound may be caused to take place by stages with different coupling components.

If desired, the resulting developed dye on the fiber may be further treated by a metallization process to increase the light fastness of the dyeing as for instance by treating the dyed fiber with an aqueous solution of a water-soluble salt of copper, cobalt, nickel or chromium.

Without limiting my invention to any particular procedure, the following examples are given to illustrate my preferred mode of operation. Parts mentioned are by weight.

*Example 1*

To 2.7 parts of a 9% slurry of copper-tetra-4-amino-phthalocyanine is added 6.3 parts of 10-normal hydrochloric acid and 1 part of 2-normal sodium nitrite, the temperature being maintained at 5° to 10° C. The dark green solution so obtained is diluted to 175 parts with ice and water in such a way that the resulting solution is at 0° C. 5 parts of cotton piece goods are stirred in this solution for 1 hour. Then the piece is removed, rinsed in cold water and treated for 15 minutes at 5° to 10° C. in 250 parts of water containing 1 part of 2-normal sodium carbonate solution and 0.25 part of 1-(4'-sulfo-phenyl)-3-methyl-5-pyrazolone. Then the dyeing is removed, rinsed and ironed dry.

The dyeing is a bright green shade with excellent washing and crocking fastness and very good lightfastness.

*Example 2*

If the developing bath in Example 1 is replaced by a developing bath consisting of 250 parts of water, 0.25 part of 2-naphthol-6-sulfonic acid, 1 part 2-normal sodium hydroxide solution and 1 part 2-normal sodium carbonate solution, a dull gray dyeing is obtained with excellent washing fastness and crocking fastness and good lightfastness.

*Example 3*

If in place of the developing bath used in Example 1 the following developing bath is used, a blue chocolate-brown dyeing is obtained with good lightfastness and good washing fastness: 250 parts of water, 0.25 part of 8-hydroxy-quinoline-5-sulfonic acid and 2 parts of 2-normal sodium carbonate solution.

*Example 4*

2.3 parts of a 10.7% aqueous slurry of di-4-amino-copper-phthalocyanine and 6.3 parts of 10-normal hydrochloric acid are cooled to 0° C. To this slurry there is added 0.5 part of 2-normal sodium nitrite solution, the mixture is stirred 1 minute and cooled again to 0° C. by the addition of ice. The slurry is stirred for 15 minutes and then diluted with ice water to 175 parts. 5 parts of cotton cloth are then stirred in this slurry for 45 minutes. The dyeing is removed, rinsed in ice water and developed in a developing bath consisting of about 250 parts of distilled water, 0.25 parts of 2-naphthol-6-sulfonic acid and sufficient quantities of sodium hydroxide and sodium carbonate to render the bath distinctly alkaline to Brilliant Yellow papers. The dyeings are turned in the developing bath for approximately 15 minutes, then removed, rinsed and ironed dry. The dyeing is blue-gray in shade, and has a very good washing fastness.

In analogous fashion, the dyeings listed in the following examples were prepared:

*Example 5*

Azotized tetra-amino-copper phthalocyanine coupled on fiber with 2-naphthol-3,6-disulfonic acid; gray shade.

*Example 6*

Azotized tetra-amino-copper phthalocyanine coupled on fiber with 2-amino-5-naphthol-7-sulfonic acid; red gray shade.

Example 7

Azotized tetra-amino-copper phthalocyanine coupled on fiber with 2-benzoylamino-5-naphthol-7-sulfonic acid; gray shade.

Example 8

Azotized triamino-copper-phthalocyanine coupled on the fiber with 2-naphthol-6-sulfonic acid; chocolate brown shade.

Example 9

Azotized triamino-copper-phthalocyanine coupled on the fiber with 1-(4'-sulfo-phenyl)-3-methyl-5-pyrazolone; green shade.

Example 10

Azotized triamino-copper-phthalocyanine coupled on the fiber with 2-naphthol-3,6-disulfonic acid; dull purple shade.

Example 11

Azotized triamino-copper-phthalocyanine coupled on the fiber with 2-amino-5-naphthol-7-sulfonic acid; blue-black shade.

Example 12

Azotized triamino-copper-phthalocyanine coupled on the fiber with 8-hydroxy quinoline-5-sulfonic acid; blue-black shade.

Example 13

Azotized diamino copper-phthalocyanine coupled on the fiber with 1-(4'-sulfo-phenyl)-3-methyl-5-pyrazolone; green shade.

Example 14

Azotized diamino copper-phthalocyanine coupled on the fiber with 8-hydroxy-quinoline-5-sulfonic acid; blue gray shade.

Example 15

Azotized diamino copper-phthalocyanine coupled on the fiber with 2-naphthol-3,6-disulfonic acid; blue gray shade.

Example 16

Copper-tetra-4-amino-phthalocyanine is azotized as described in Example 1 and the solution is then filtered. Cotton cloth is then padded with this undiluted solution in such a way as to leave an amount of the diazo solution equal in weight to the weight of the dry cloth in the fiber. Coupling of the diazo on the fiber to sulfo-phenyl-methyl-pyrazolone is then carried out in a similar manner so that already described in Example 1 except that sufficiently more alkali may have to be added to maintain the alkalinity of the developing bath to a definite test on Brilliant Yellow papers. The cloth is finally rinsed in water and dried. The dyeing so obtained is blue-green in shade and has excellent washing fastness and excellent lightfastness.

Example 17

If the procedure of Example 16 is followed, with the exception that 0.25 part of 2-naphthol-6-sulfonic acid is substituted for the pyrazolone in the developing bath, a dull gray dyeing with good wash fastness and lightfastness is obtained.

Example 18

Copper-tetra-(4)-amino-phthalocyanine is azotized as in Example 1, and, while holding the temperature at 0° C., the acidity is adjusted by the addition of sodium acetate until it reaches a pH value of approximately 3. This solution is then thickened to a printing paste by the addition of a thickener, as for example gum tragacanth. Cloth is prepadded with a solution containing 4 parts of 1-(4'-sulfophenyl)-3-methyl-5-pyrazolone per 100 parts of water and sufficient sodium carbonate to maintain distinct Brilliant Yellow alkalinity. The fabric is squeezed until it retains its own weight of the solution and then dried. It is then printed with the above paste, dried, rinsed and dried. The print is green in shade and displays excellent washing and lightfastness.

Example 19

0.5 part of 2-benzoylamino-5-naphthol-7-sulfonic acid is dissolved in 200 parts of water with the aid of a small amount of sodium carbonate. The temperature of the solution is raised to 95° C. and sufficient acetic acid is added to make the solution definitely acid to litmus. 5 parts of cotton cloth are then entered into the bath and 2 parts of sodium chloride are added. The cloth is then turned in the bath and the temperature is allowed to drop slowly to room temperature. The cloth is removed and entered into 175 parts of a solution of azotized tetra-amino-copper-phthalocyanine prepared as in Example 1, to which has been added sufficient sodium acetate to reduce the acidity until it is neutral to Congo red paper. The dyeing is turned in this bath for 30 minutes, removed, rinsed well with cold water and dried.

The dyeing obtained is gray in shade, has a very good washing fastness and good lightfastness.

In the above examples, instead of preparing solutions of azotized amino-copper-phthalocyanine by freshly diazotizing an amino-phthalocyanine, solutions fulfilling the requirements of the invention may be prepared readily by dissolving and acidifying metallic double salts of an azotized amino-phthalocyanine or converting a stable alkali-metal isodiazotate of a polyamino-phthalocyanine to the active phthalocyanine poly-diazotate by treatment with cold mineral acid, as described more fully in copending application Serial No. 443,668 (Pat. No. 2,349,090).

In lieu of the various polyamino-phthalocyanines of copper, the corresponding derivatives of nickel-phthalocyanine, cobalt-phthalocyanine, metal-free phthalocyanine, or their various homologs, analogs and water-insoluble substitution derivatives may be employed, such as the chloro, nitro, alkyl and alkoxy substituted products.

Other variations in details of procedure may be resorted to without departing from the spirit of this invention, as will be readily apparent to those skilled in this art.

I claim:

1. A process of coloring textile material, which comprises developing on the fiber an azo coloring matter of the phthalocyanine series by coupling on the fiber an azotized polyamino-phthalocyanine to a coupling component containing a water-solubilizing group.

2. A process of coloring textile material, which comprises impregnating the same with an azotized polyamino-phthalocyanine, and treating the impregnated material with an aqueous bath of a coupling component possessing a water-solubilizing group, to develop a wash-fast azo dye on the fiber.

3. A process of coloring textile material, which comprises impregnating the same with a solution of a coupling component possessing a water-solubilizing group and then treating the impregnated fabric with an azotized polyamino-phthalocyanine to develop a wash-fast azo dye on the fiber.

4. A process of coloring textile material, which comprises impregnating the same with an azotized polyamino-metal-phthalocyanine and treating the impregnated material with an aqueous bath containing a coupling component which possesses at least one water-solubilizing substituent from the group consisting of sulfo and carboxy.

5. A process of coloring textile material, which comprises impregnating the same with an azotized polyamino-copper-phthalocyanine and treating the material with an aqueous bath containing 1-(4'-sulfo-phenyl)-3-methyl-5-pyrazolone to develop a wash-fast azo dye on the fiber.

6. A process of coloring textile material, which comprises impregnating the same with an azotized polyamino-copper-phthalocyanine and treating the material with an aqueous bath containing 2-naphthol-6-sulfonic acid to develop a wash-fast azo dye on the fiber.

7. A process of coloring textile material, which comprises impregnating the same with an azotized polyamino-copper-phthalocyanine and treating the material with an aqueous bath containing 8-hydroxy-quinoline-5-sulfonic acid to develop a wash-fast azo dye on the fiber.

8. Textile material being colored by an azo dyestuff of the phthalocyanine series as defined in claim 1, developed on the fiber by a process as therein defined.

9. Textile material being colored by an azo dyestuff of the phthalocyanine series as defined in claim 4, developed on the fiber by a process as therein defined.

JAMES WILLIAM LIBBY, JR.

CERTIFICATE OF CORRECTION

Patent No. 2,363,537.    November 28, 1944.

JAMES WILLIAM LIBBY, JR.

It is hereby certified that error appears in the printed specification of the above numbered patent requiring correction as follows: Page 2, first column, line 62, for "ntpthol" read --naphthol--; page 3, first column, line 55, for the words "manner so" read --manner to--; and that the said Letters Patent should be read with this correction therein that the same may conform to the record of the case in the Patent Office.

Signed and sealed this 27th day of February, A. D. 1945.

(Seal)

Leslie Frazer
Acting Commissioner of Patents.

nated fabric with an azotized polyamino-phthalocyanine to develop a wash-fast azo dye on the fiber.

4. A process of coloring textile material, which comprises impregnating the same with an azotized polyamino-metal-phthalocyanine and treating the impregnated material with an aqueous bath containing a coupling component which possesses at least one water-solubilizing substituent from the group consisting of sulfo and carboxy.

5. A process of coloring textile material, which comprises impregnating the same with an azotized polyamino-copper-phthalocyanine and treating the material with an aqueous bath containing 1-(4'-sulfo-phenyl)-3-methyl-5-pyrazolone to develop a wash-fast azo dye on the fiber.

6. A process of coloring textile material, which comprises impregnating the same with an azotized polyamino-copper-phthalocyanine and treating the material with an aqueous bath containing 2-naphthol-6-sulfonic acid to develop a wash-fast azo dye on the fiber.

7. A process of coloring textile material, which comprises impregnating the same with an azotized polyamino-copper-phthalocyanine and treating the material with an aqueous bath containing 8-hydroxy-quinoline-5-sulfonic acid to develop a wash-fast azo dye on the fiber.

8. Textile material being colored by an azo dyestuff of the phthalocyanine series as defined in claim 1, developed on the fiber by a process as therein defined.

9. Textile material being colored by an azo dyestuff of the phthalocyanine series as defined in claim 4, developed on the fiber by a process as therein defined.

JAMES WILLIAM LIBBY, JR.

---

CERTIFICATE OF CORRECTION

Patent No. 2,363,537.                                November 28, 1944.

JAMES WILLIAM LIBBY, JR.

It is hereby certified that error appears in the printed specification of the above numbered patent requiring correction as follows: Page 2, first column, line 62, for "ntpthol" read --naphthol--; page 3, first column, line 55, for the words "manner so" read --manner to--; and that the said Letters Patent should be read with this correction therein that the same may conform to the record of the case in the Patent Office.

Signed and sealed this 27th day of February, A. D. 1945.

(Seal)

Leslie Frazer
Acting Commissioner of Patents.